United States Patent
Lee

(10) Patent No.: US 9,366,326 B2
(45) Date of Patent: Jun. 14, 2016

(54) DEVICE WITH A ROTATION EFFECT

(71) Applicant: BENEXT INNO-PRODUCT DEVELOPMENT LTD., New Taipei (TW)

(72) Inventor: Vincent K. Lee, New Taipei (TW)

(73) Assignee: Benext Inno-Product Development Ltd., New Taipei (TW)

( * ) Notice: Subject to any disclaimer, the term of this patent is extended or adjusted under 35 U.S.C. 154(b) by 125 days.

(21) Appl. No.: 14/469,642

(22) Filed: Aug. 27, 2014

(65) Prior Publication Data
US 2015/0090059 A1 Apr. 2, 2015

(30) Foreign Application Priority Data
Sep. 27, 2013 (TW) ................ 102134910

(51) Int. Cl.
| | |
|---|---|
| *F16H 25/12* | (2006.01) |
| *B43K 24/08* | (2006.01) |
| *F16F 9/12* | (2006.01) |
| *F16H 25/18* | (2006.01) |
| *B43K 7/12* | (2006.01) |
| *B43K 29/00* | (2006.01) |
| *B43K 29/10* | (2006.01) |
| *B43K 7/00* | (2006.01) |
| *A45D 34/00* | (2006.01) |

(52) U.S. Cl.
CPC .............. *F16H 25/122* (2013.01); *A45D 34/00* (2013.01); *B43K 7/005* (2013.01); *B43K 7/12* (2013.01); *B43K 24/084* (2013.01); *B43K 29/00* (2013.01); *B43K 29/004* (2013.01); *B43K 29/10* (2013.01); *F16F 9/12* (2013.01); *F16H 25/186* (2013.01); *A45D 2034/007* (2013.01); *A45D 2200/056* (2013.01); *Y10T 74/18568* (2015.01)

(58) Field of Classification Search
CPC ........... A63F 5/04; A63F 5/045; A63F 5/048; B43K 24/08; B43K 24/084; B43K 29/00; B43K 29/002; B43K 29/10; B43K 7/005; F16F 9/12; F16H 25/122; A63H 1/06; Y10T 74/18576
USPC ............... 273/138.1, 141 R, 142 R; 401/195; 446/236, 241
See application file for complete search history.

(56) References Cited

U.S. PATENT DOCUMENTS

| | | | | |
|---|---|---|---|---|
| 3,404,891 A | * | 10/1968 | Glass | ............. A63F 3/00006 273/143 R |
| 5,238,440 A | * | 8/1993 | Morin | ................. A63H 1/06 273/142 E |
| 8,226,314 B2 | | 7/2012 | Lee | |
| 2010/0098477 A1 | * | 4/2010 | Lee | ................. B43K 24/084 401/103 |
| 2010/0322696 A1 | * | 12/2010 | Liu | .................... B43K 7/005 401/99 |

* cited by examiner

*Primary Examiner* — Jennifer C Chiang
*Assistant Examiner* — Bradley Oliver
(74) *Attorney, Agent, or Firm* — Alan D. Kamrath; Kamrath IP Lawfirm, P.A.

(57) ABSTRACT

A device with a rotation effect includes an external barrel, a rotation barrel, a rotation mechanism, a pressing mechanism and a deceleration mechanism. The rotation barrel is disposed in the external barrel. The rotation mechanism connects with the rotation barrel for rotating the rotation barrel. The pressing mechanism connects with the external barrel. The deceleration mechanism connects with the rotation barrel to reduce the rotation speed of the rotation barrel.

20 Claims, 18 Drawing Sheets

DEVICE WITH A ROTATION EFFECT

BACKGROUND OF THE DISCLOSURE

1. Field of the Disclosure

The present disclosure relates to a device with a rotation effect, such as a ballpoint pen, a key chain, a shower gel container, or other device.

2. Description of the Related Art

Devices with a rotation effect are seldom applied on devices such as ballpoint pens or key chains. U.S. Pat. No. 8,226,314 is a granted patent of the present applicant. U.S. Pat. No. 8,226,314 discloses a press action device; after a ballpoint pen is pressed, one or multiple rotation barrels disposed inside the ballpoint pen rotate fast, and then eventually one side of the rotation barrel is displayed randomly in the window of the ballpoint pen to present entertainment value.

However, some entertainment value factors of the patterns printed on the rotation barrel are designed to be presented more impressively at a low rotation speed of the rotation barrel. Therefore, there is a need to develop a rotation mechanism capable of performing a rotation at a low rotation speed, especially a mechanical mechanism requiring no electronic power. In addition, it is a challenging task to install the mechanical mechanism within a small space like a ballpoint pen.

SUMMARY OF THE DISCLOSURE

It is an object of the present disclosure to provide a device with a rotation effect; more particularly, after the device is pressed, a rotation barrel inside the device rotates at a reduced rotation speed.

To achieve the aforementioned object, the device with a rotation effect of the present disclosure comprises an external barrel, a rotation barrel, a rotation mechanism, a pressing mechanism and a deceleration mechanism.

The rotation barrel is disposed in the external barrel, and the rotation mechanism is connected with the rotation barrel for rotating the rotation barrel. The pressing mechanism is connected with the external barrel and comprises a pressing course and a releasing course. The pressing mechanism drives the rotation mechanism to rotate along a first direction during the pressing course. The rotation mechanism rotates along a second direction during the releasing course, wherein the second direction and the first direction are opposite directions.

The deceleration mechanism is connected with the rotation barrel to reduce the rotation speed of the rotation barrel. According to a preferred embodiment, the deceleration mechanism comprises a guide ring and a damping element, wherein the damping element is a damping oil, such that the rotation speed of the rotation barrel is reduced accordingly by the damping oil.

BRIEF DESCRIPTION OF THE DRAWINGS

The exemplary embodiment of the present disclosure will be understood more fully from the detailed description given below and from the accompanying drawings of the disclosure, which, however, should not be taken to limit the disclosure to the specific embodiment, but are for explanation and understanding only.

DETAILED DESCRIPTION OF THE PREFERRED EMBODIMENT

Figure 1:
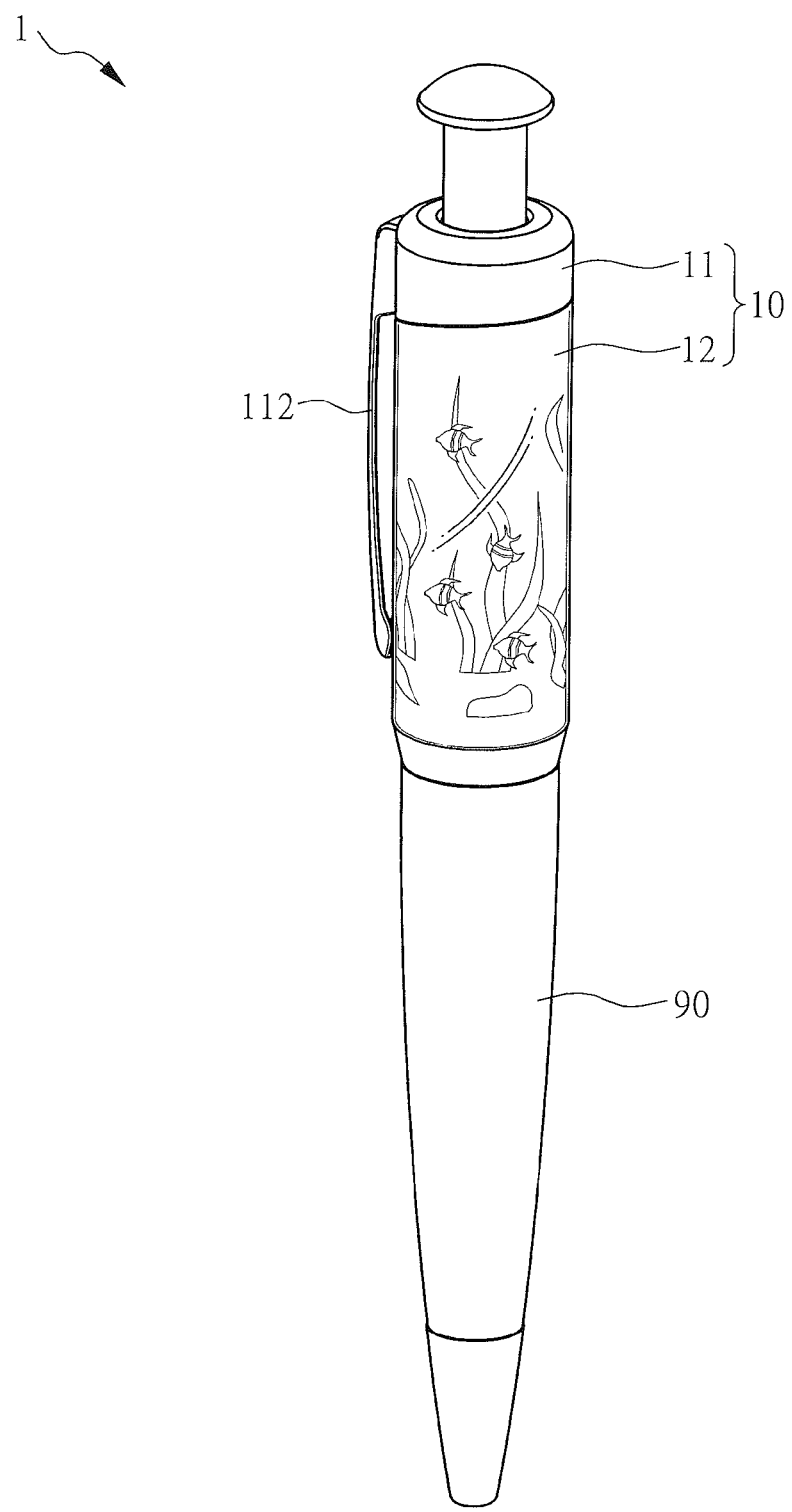
FIG. 1 is a schematic drawing of the first embodiment of the present disclosure.
Figure 2:
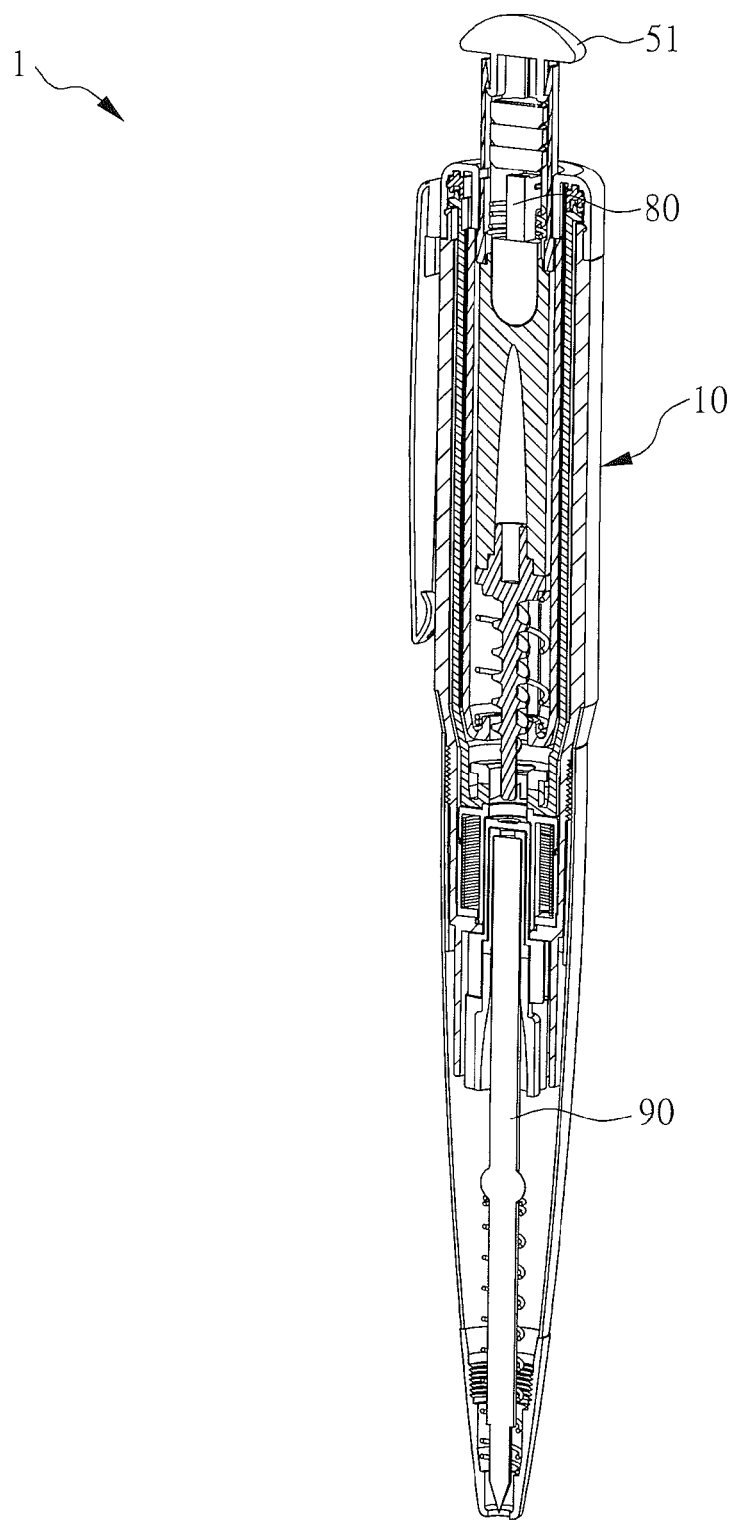
FIG. 2 illustrates a cross-section view of the first embodiment of the present disclosure.
Figure 3:
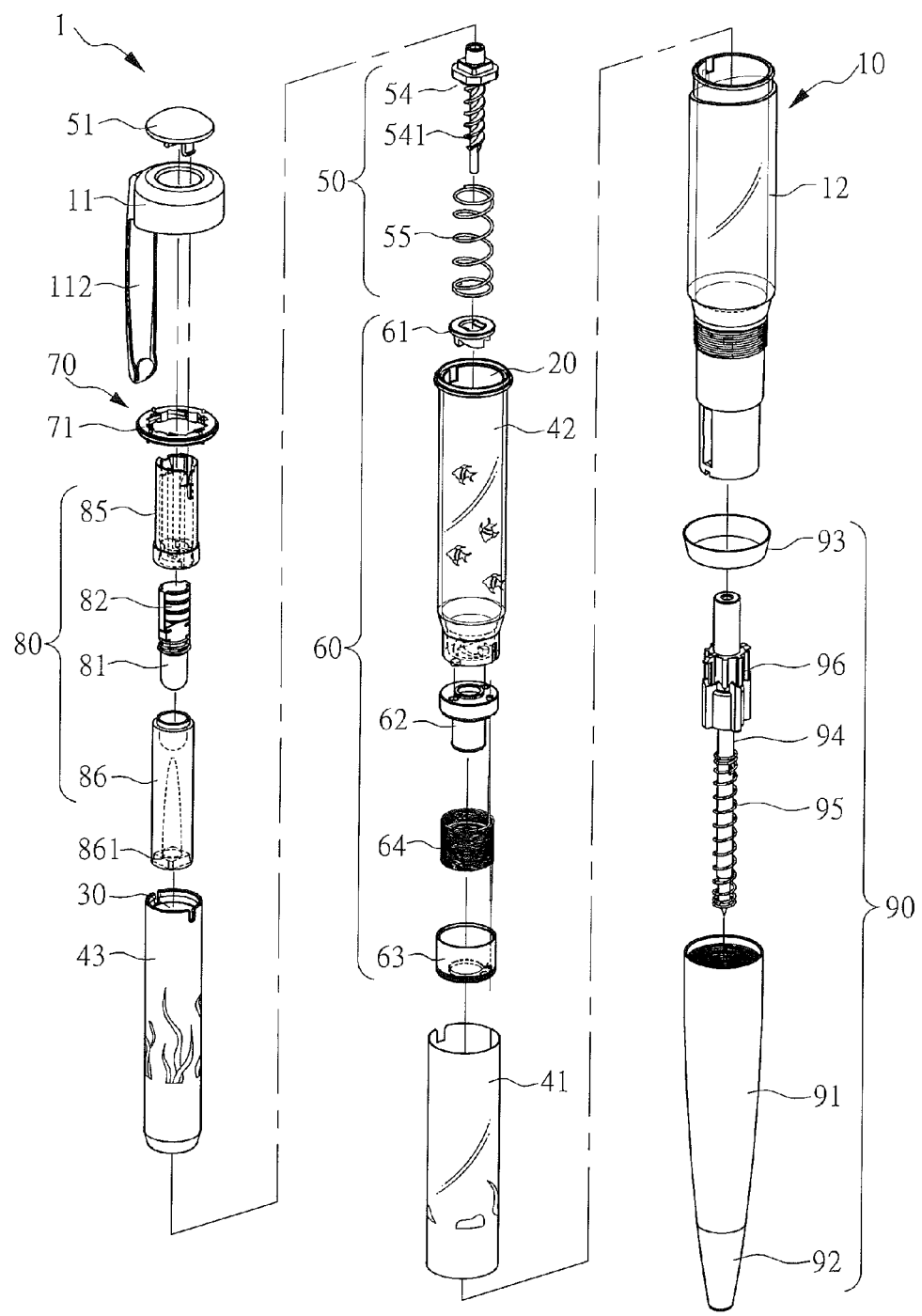
FIG. 3 is an exploded view of the first embodiment of the present disclosure.

To facilitate understanding and to clarify the object, characteristics, and advantages of the present disclosure, the following three specific embodiments and figures illustrating the present disclosure are presented as a detailed description.

Please refer to FIG. 1 to FIG. 10, which are related to the first embodiment.

The device with a rotation effect 1 of the present disclosure is a ballpoint pen and mainly comprises an external barrel 10, a rotation barrel 20, an internal barrel 30, a pressing mechanism 50, a rotation mechanism 60, a deceleration mechanism 70, an illuminating mechanism 80 and a pen mechanism 90.

The external barrel 10 comprises an upper external barrel 11 and a main external barrel 12. In the present embodiment, the upper external barrel 11 is a pen cap with a pen clip 112, and the pen mechanism 90 is connected with the lower portion of the main external barrel 12. The pen mechanism 90 disclosed in the present embodiment is a conventional pen mechanism, which is a known prior art in which a pen refill of the pen mechanism is capable of being protruded or retracted when the button of the pen mechanism is pressed. The pen mechanism 90 comprises a holding barrel 91, a front end 92, a decorative ring 93, a pen refill 94, a pen refill spring 95, and a retractable assembly 96. Because the pen mechanism 90 is not the improved part of the present disclosure and the mechanism of the pen mechanism 90 also is a known art, there is no need to describe its structure in detail.

Please refer to FIG. 3 to FIG. 7. The pressing mechanism 50 comprises a push button 51 (the button of the ballpoint pen in the present embodiment), a rotation shaft 54 and an elastic member 55. The rotation shaft 54 comprises a rotary rim 541; in the present embodiment, the rotation shaft 54 is a screw rod and the rotary rim 541 is a thread. Please refer to FIG. 6. In the present embodiment, an illuminating mechanism 80 is disposed beneath the push button 51.

The illuminating mechanism 80 comprises an illuminating device 81 (such as an LED), a plurality of batteries 82, an illuminating barrel 85 and a light guide post 86. The upper end of the illuminating barrel 85 is directly engaged with the push button 51 (shown in FIG. 5). The illuminating device 81 is directly connected with the light guide post 86; i.e., the light guide post 86 is connected with the illuminating barrel 85 and the illuminating device 81 protrudes from the illuminating barrel 85 and inserts into the light guide post 86. The illuminating mechanism 80 further provides a decorative effect of light, so the upper portion of the device having a rotation effect 1 is illuminable. Please note that because applying the illuminating mechanism 80 on a ballpoint pen is a known art and the illuminating mechanism 80 is not the improved part of the present disclosure, there is no need to describe its circuit structure in detail.

The pressing mechanism 50 is connected with the external barrel 10. In the present embodiment, the push button 51 is situated above the upper external barrel 11. The internal barrel 30 is disposed in the rotation barrel 20, and the rotation shaft 54 and the elastic member 55 are disposed in the internal barrel 30. The top end of the rotation shaft 54 is hold by the small hole 861 of the light guide post 86.

Figure 6:
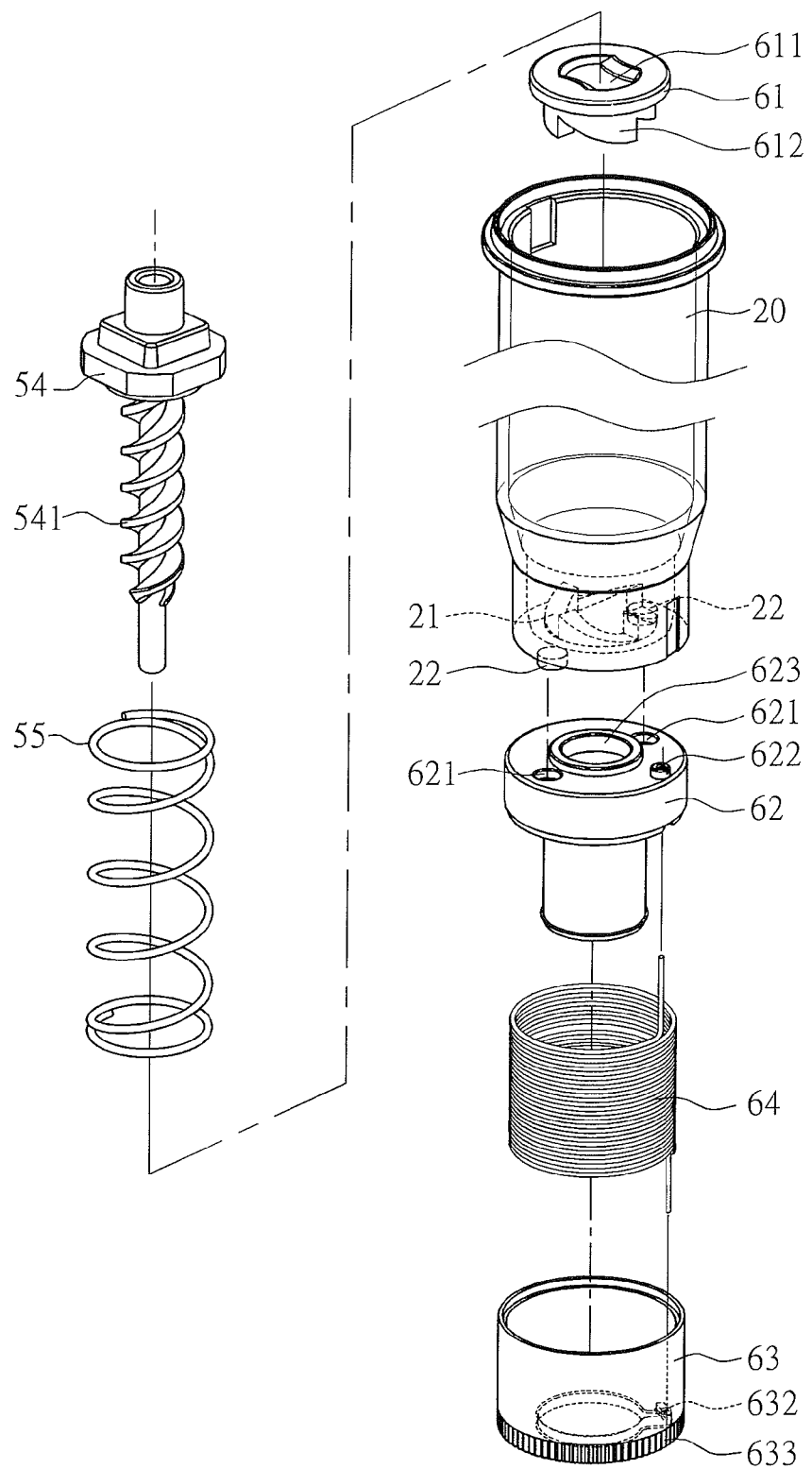
FIG. 6 is an exploded view of the rotation barrel, the pressing mechanism and the rotation mechanism of the first embodiment of the present disclosure.

Please refer to FIG. 3 to FIG. 7. The rotation mechanism 60 comprises a rotation guiding element 61, a rotation element 62, a mating part 63 and a torsional elastic member 64. The rotation guiding element 61 is disposed in the rotation barrel 20 and is situated beneath the internal barrel 30. The rotation guiding element 61 coordinates with the rotation shaft 54 and comprises a guide slot 611, as shown in FIG. 6. When the rotation shaft 54 moves forward (e.g. downwards), due to the shape of the guide slot 611, the moving rotary rim 541 drives the guide slot 611 to allow the rotation guiding element 61 to rotate along the first direction, which is a counter clockwise rotation in the present embodiment. It is noted that how the rotation guiding element 61 coordinates with the guide slot 611 to perform a rotation is a known art; please refer to U.S. Pat. No. 8,226,314.

Please refer to FIG. 6. The rotary tooth 612 is disposed at the lower portion of the rotation guiding element 61. The rotary tooth 612 is designed with an inclined plane, and the guide tooth 21 disposed at the lower portion of the rotation barrel 20 also has an inclined plane to match with the inclined plane of the rotary tooth 612. Therefore, when the rotation guiding element 61 rotates along the first direction, the rotation barrel 20 also rotates along the first direction accordingly.

Figure 7:
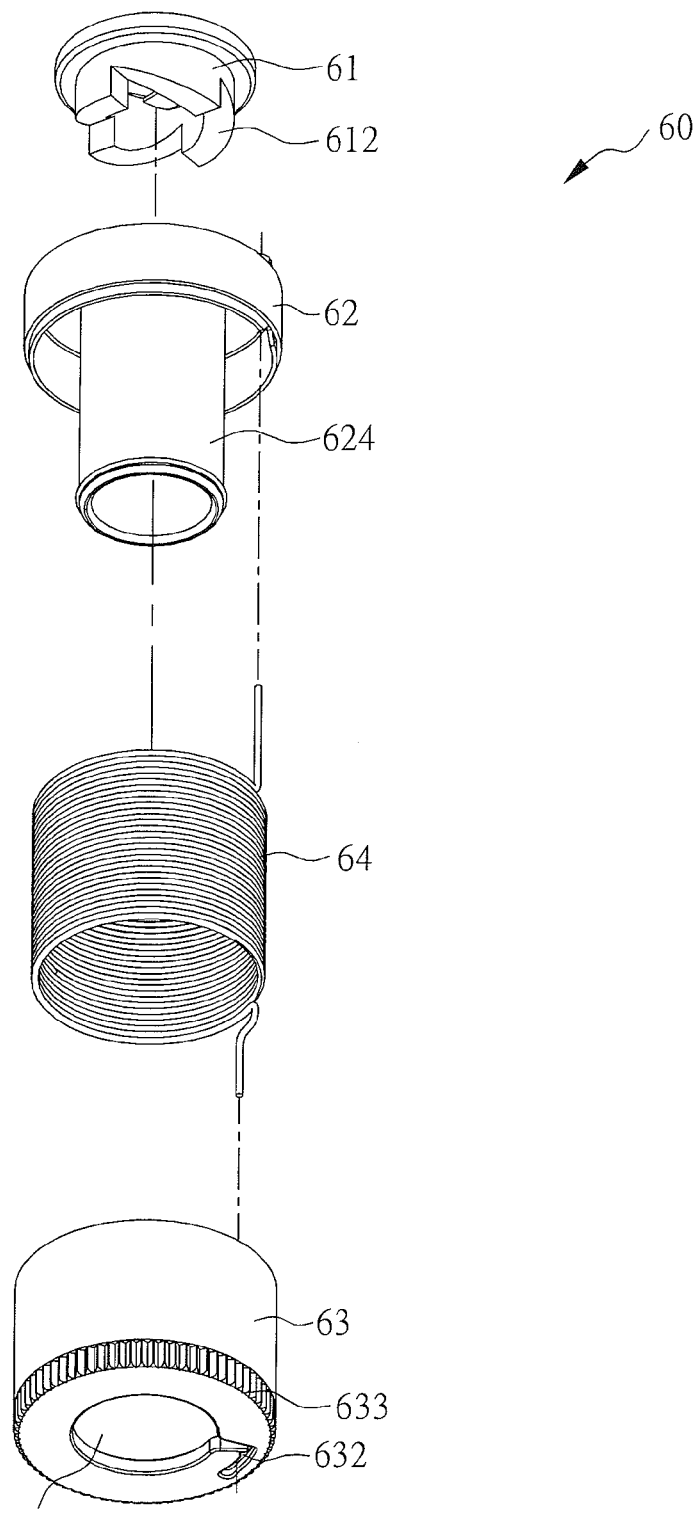
FIG. 7 is an exploded view of the rotation mechanism of the first embodiment.
Figure 8:
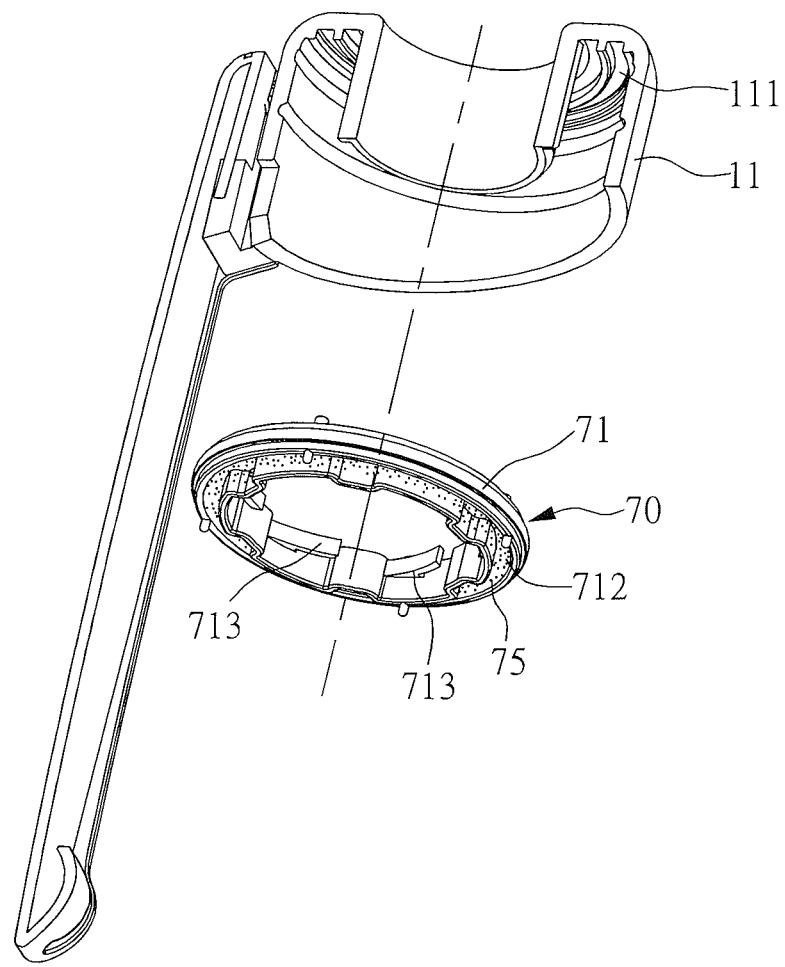
FIG. 8 is an exploded view of the first embodiment of the upper external barrel and the deceleration mechanism of the present disclosure.
Figure 9:
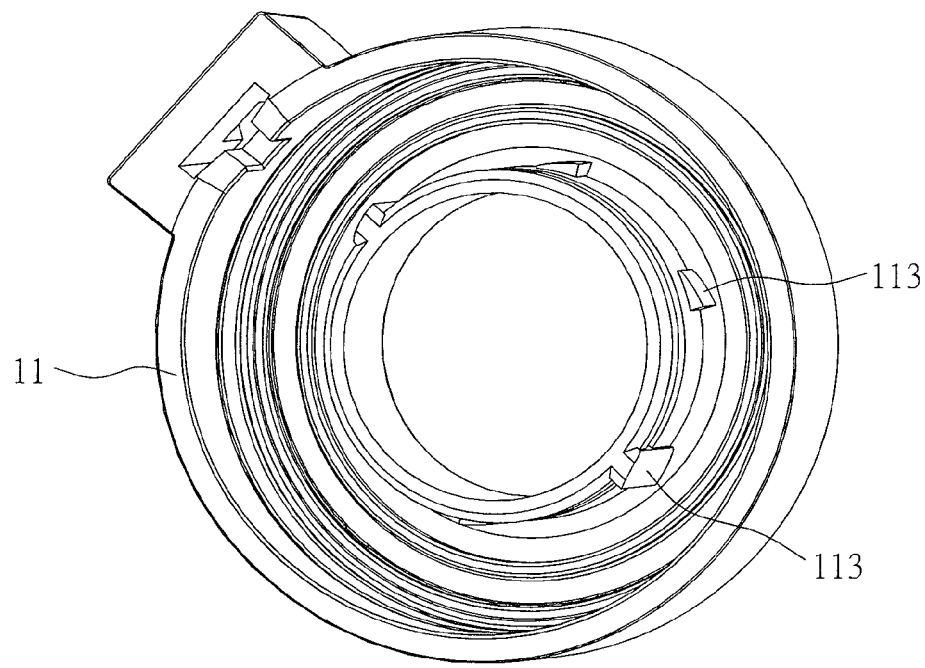
FIG. 9 is a bottom-view of the upper external barrel of the first embodiment of the present disclosure.
Figure 10:
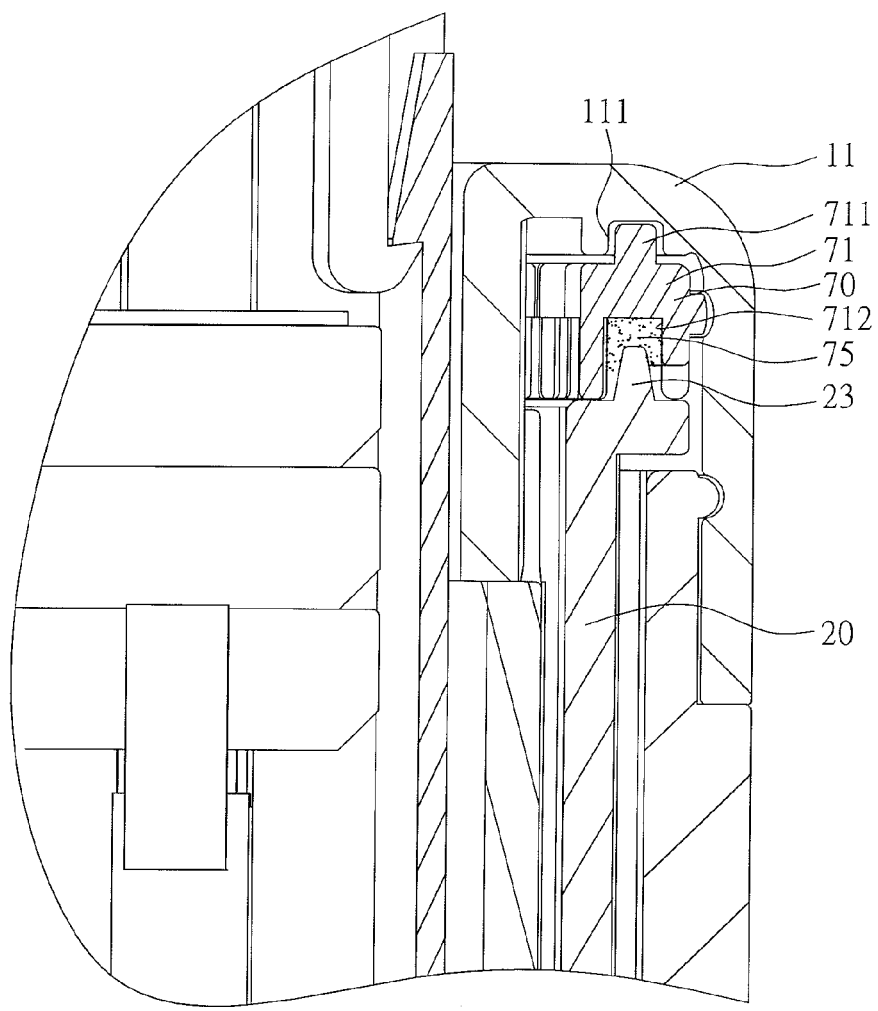
FIG. 10 is a partly enlarged cross-section view of the first embodiment of the present disclosure to illustrate the upper external barrel and the deceleration mechanism.

Please refer to FIG. 6 to FIG. 7. The convex post 624 of the rotation element 62 matches with the circle hole 634 of the mating part 63 to allow the rotation element 62 to rotate relative to the mating part 63. The two ends of the torsional elastic member 64 are connected with the mounting hole 622 of the rotation element 62 and the mounting hole 632 of the mating part 63, respectively.

The rotation member 22 is disposed at the lower portion of the rotation barrel 20. In this embodiment, the rotation member 22 is two protrusions for matching with the guide element 621 disposed at the upper portion of the rotation element 62, such that the rotation barrel 20 and the rotation element 62 are capable of rotating synchronously. In this embodiment, the guide element 621 is two cavities.

The mating part 63 is fixed to the lower portion of the main external barrel 12, for example by glue or another fixing method. A plurality of strip ribs is disposed on the engagement part 633 in the present embodiment. The main external barrel 12 comprises a plurality of strip grooves corresponding to the plurality of strip ribs, not shown in the FIG, for engaging with the engagement part 633, such that the mating part 63 is unable to rotate after the mating part 63 has been disposed on the main external barrel 12. Therefore, when the rotation element 62 rotates along the first direction, the torsional elastic member 64 is twisted tightly; when the rotation element 62 stops rotating along the first direction, the torsion of the torsional elastic member 64 drives the rotation element 62 to rotate along the second direction, which is a clockwise rotation in the present embodiment.

In the present embodiment, the deceleration mechanism 70 comprises a guide ring 71 and a damping element 75. Please refer to FIG. 8 to FIG. 10. The guide ring 71 comprises a round protruding rib 711, an annular groove 712, and a plurality of brake strips 713. The upper external barrel 11 has a positioning groove 111 to match with the round protruding rib 711. The top end of the rotation barrel 20 has a damping guide member 23, which is circular-shaped, to match with the annular groove 712. In the present embodiment, the damping element 75 is a damping oil. When the present disclosure is being assembled, damping oil 75 is applied to the annular groove 712 for allowing the damping guide member 23 to reduce the rotation speed of the rotation barrel 20 due to contact with the damping oil 75 while the rotation barrel 20 is rotating freely. Please refer to FIG. 9, which illustrates a bottom-view perspective of the upper external barrel 11. The upper external barrel 11 has a plurality of brake blocks 113 to match with the brake strips 713, and each of the brake blocks 113 is triangular in shape. When the guide ring 71 rotates along the first direction (counter clockwise in the present embodiment), none of the brake blocks 113 blocks any of the brake strips 713, so the guide ring 71 rotates along the first direction smoothly. On the other hand, when the guide ring 71 rotates along the second direction (clockwise in the present embodiment), each brake block 113 blocks the corresponding brake strip 713 and then causes the guide ring 71 to be unable to rotate along the second direction.

Figures 4, 5:
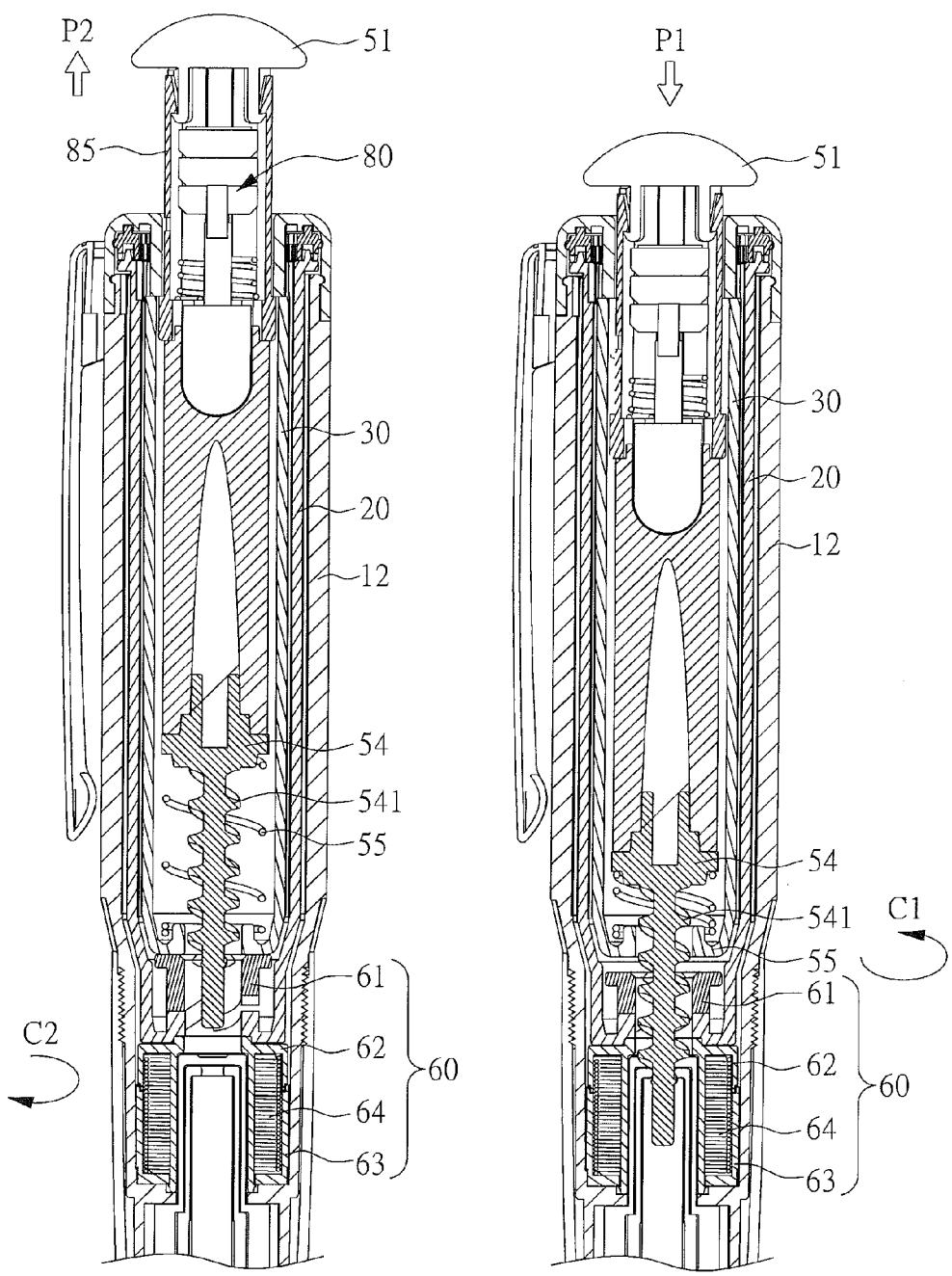
FIG. 4 is a partly enlarged cross-section view of the first embodiment to illustrate a state in which the pressing mechanism is not being pushed.
FIG. 5 is a partly enlarged cross-section view of the first embodiment to illustrate a state in which the pressing mechanism is being pushed.

To complement the brief description of the abovementioned elements, the operating flow of the present disclosure is presented as follows. As shown in FIG. 4, the push button 51 has yet to be pressed, so the major portion of the rotation shaft 54 is situated above the rotation guiding element 61. As shown in FIG. 5, after a user pushes the push button 51, the push button 51 is in the pressing course P1; the push button 51 pushes the illuminating barrel 85 and the light guide post 86 downward, which consequently causes the rotation shaft 54 to move downward and then drives the rotation guiding element 61 to rotate. The rotation element 62 comprises a through hole 623 for allowing the downward-moving rotation shaft 54 to enter the rotation element 62 and then to drive the rotation guiding element 61 to rotate along the first direction C1. Because the rotation shaft 54 also pushes the rotation guiding element 61 downward, the rotary tooth 612 of the rotation guiding element 61 is engaged with the guide tooth 21 of the rotation barrel 20, such that the rotation barrel 20 also rotates along the first direction accordingly, and then the rotation member 22 of the rotation barrel 20 drives the rotation element 62 to rotate along the first direction. As a result, the torsional elastic member 64 is twisted tightly. Please refer to FIG. 8, FIG. 9 and FIG. 10; when the rotation barrel 20 rotates along the first direction, the damping guide member 23 situated above the rotation barrel 20 drives the guide ring 71 to rotate along the first direction as well, due to the damping oil 75. Because during the pressing course P1, none of the brake strips 713 are blocked by the brake blocks 113, there is no need to overcome the resistance caused by the damping oil 75 when the user pushes the push button 51.

The user can press the push button 51 several times quickly to increase the tension level of the torsional elastic member 64. After the user releases the push button 51, the push button 51 is in the releasing course P2. Please refer to FIG. 4; the resilience of the elastic member 55 pushes the rotation shaft 54 to move backward (e.g. upward) and the rotation guiding element 61 also moves backward due to the movement of the rotation shaft 54. Thus, the rotary tooth 612 of the rotation guiding element 61 does not engage with the guide tooth 21 of the rotation barrel 20 anymore. Then the torsion of the torsional elastic member 64 drives the rotation element 62 to rotate along the second direction C2, and the rotation element 62 drives the rotation barrel 20 to rotate along the second direction C2 as well. Due to the viscosity of the damping oil 75, the damping guide member 23 will tend to rotate along the second direction C2. However, the guide ring 71 is unable to rotate along the second direction because each of the brake blocks 113 blocks each of the corresponding brake strips 713. As a result, the rotation speed of the rotation barrel 20 is reduced because of the resistance applied to the damping guide member 23 by the damping oil 75.

The device with a rotation effect 1 further comprises an external barrel decoration 41, a rotation barrel decoration 42 and an internal barrel decoration 43. The external barrel decoration 41 can be a plastic sheet printed with patterns and installed within the transparent main external barrel 12. The external barrel decoration 41 can also be patterns printed on the exterior of the main external barrel 12. The rotation barrel decoration 42 can be printed on the exterior of the rotation barrel 20, or the rotation barrel decoration 42 can be stickers with patterns and attached to the exterior of the rotation barrel 20. The internal barrel decoration 43 can be printed on the exterior surface of the internal barrel 30, or the internal barrel decoration 43 can be stickers with patterns and attached to the exterior surface of the internal barrel 30. Because the rotation barrel 20 is the important feature of the present disclosure, the rotation barrel decoration 42 is essential. When the rotation barrel decoration 42 rotates, the external barrel decoration 41 and/or the internal barrel decoration 43 do not rotate accordingly; the entertaining feature of the present disclosure is presented by the collocation of the external barrel decoration 41 and/or the internal barrel decoration 43.

It is noted that the illuminating mechanism 80 is not a necessary element of the present disclosure. The rotation shaft 54 can be modified by increasing the length of the rotation shaft 54, disposing a convex post above the rotation shaft 54 or the like, to allow the top end of the rotation shaft 54 to touch the push button 51 directly and to achieve the object of allowing the push button 51 to push the rotation shaft 54.

Figure 11:
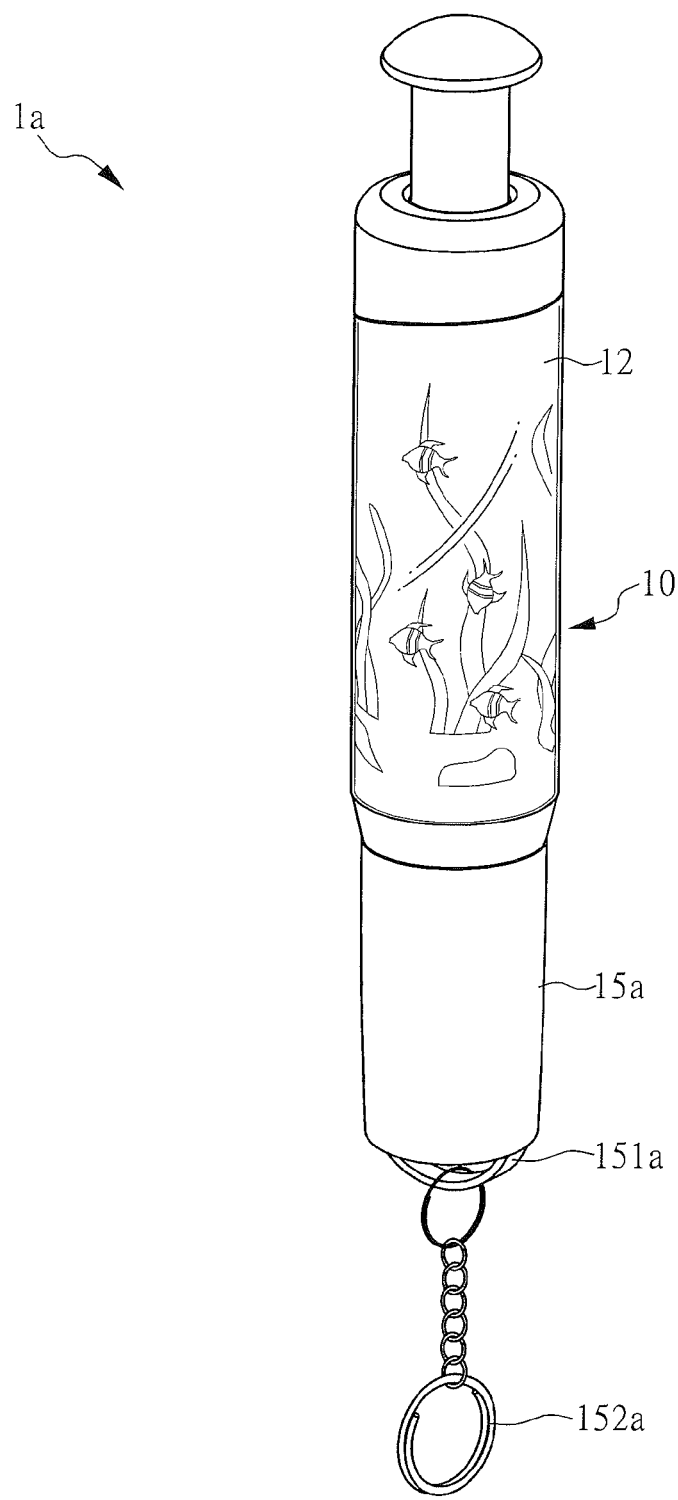
FIG. 11 is a schematic drawing of the second embodiment of the present disclosure.
Figure 12:
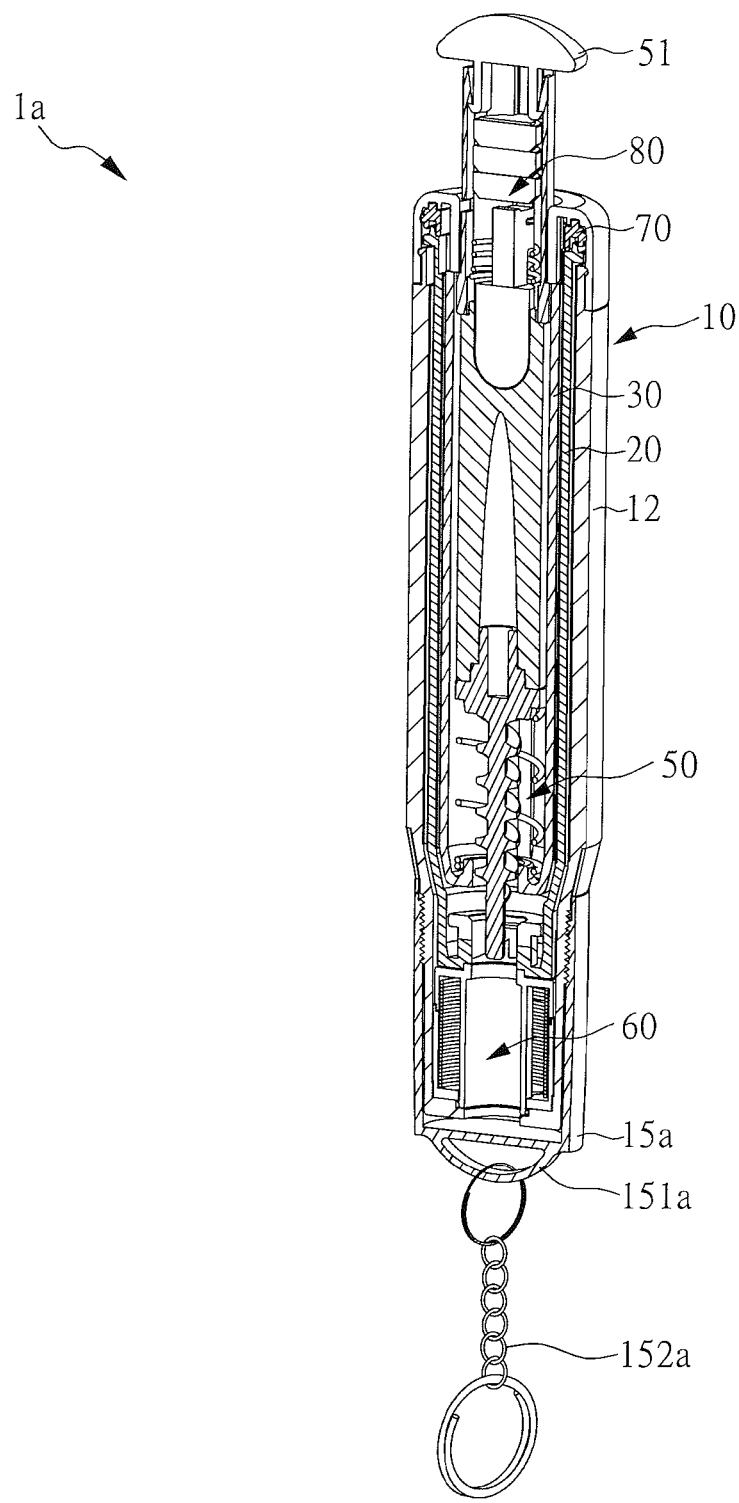
FIG. 12 illustrates a cross-section view of the second embodiment of the present disclosure.
Figure 13:
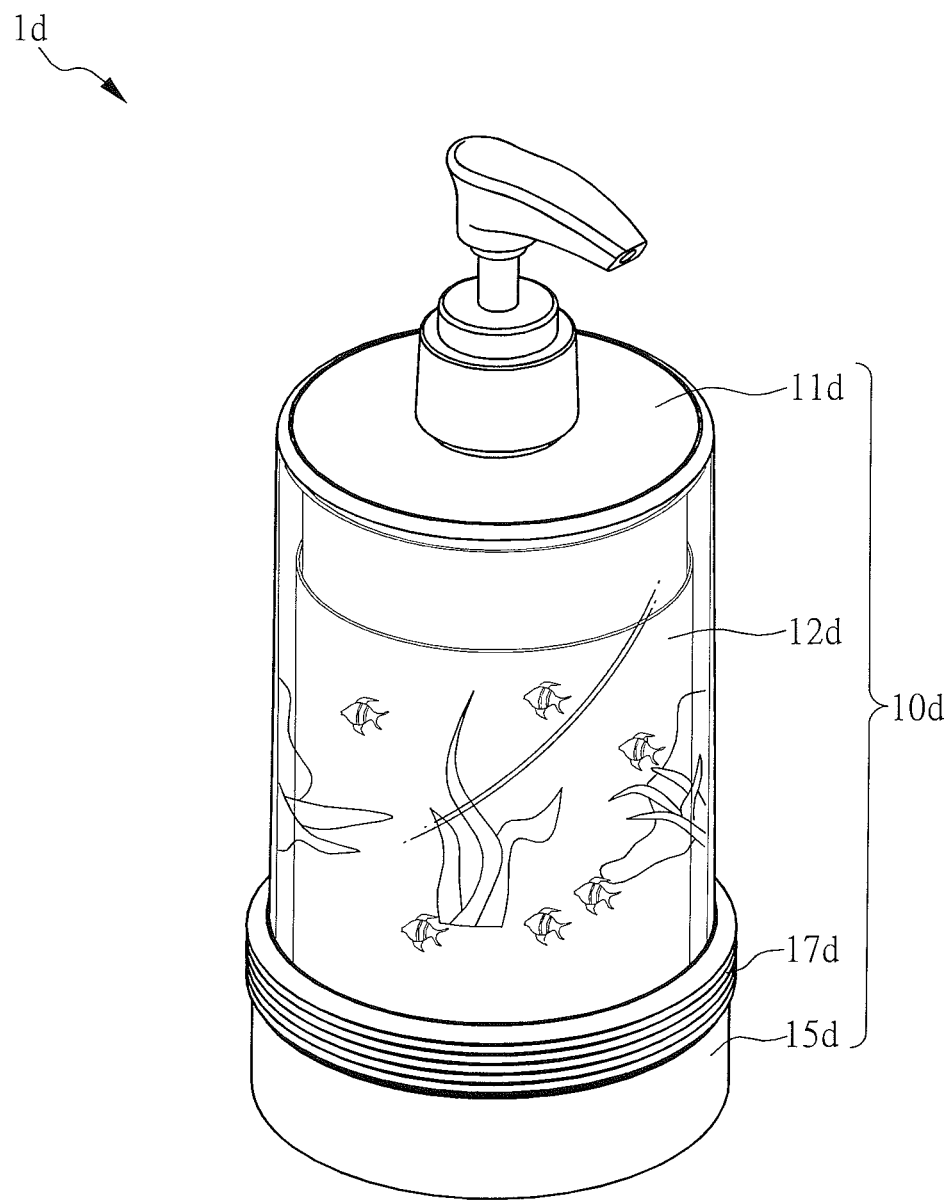
FIG. 13 is a schematic drawing of the third embodiment of the present disclosure.
Figure 14:
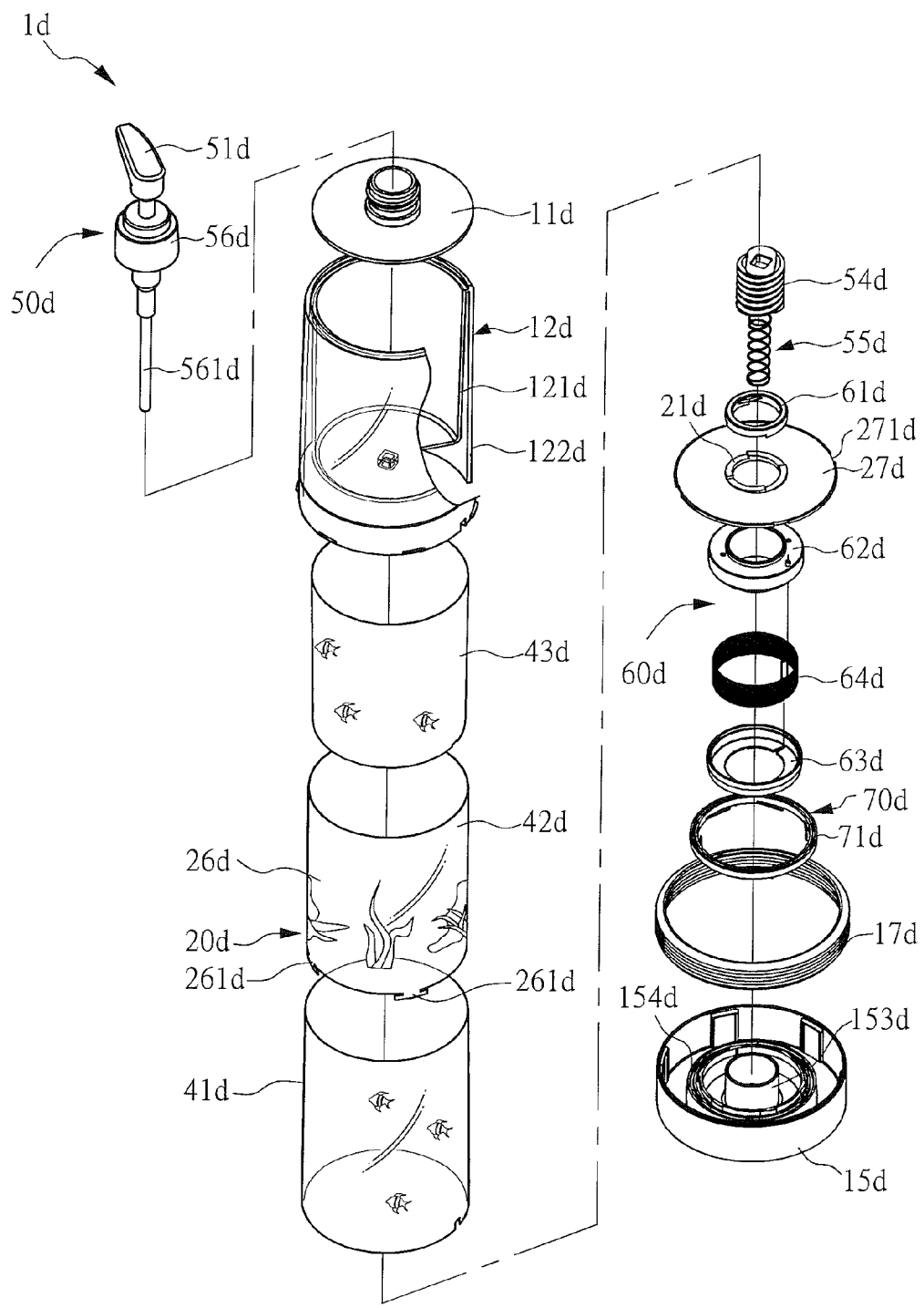
FIG. 14 is an exploded view of the third embodiment of the present disclosure.

Please refer to FIG. 11 and FIG. 12, which are related to the second embodiment.

The device having a rotation effect 1a is a key chain. The major difference between the device with a rotation effect 1a and the first embodiment is that the pen mechanism 90 is omitted in the device having a rotation effect 1a. The lower portion of the main external barrel 12 is connected with a lower external barrel 15a. A connecting ring 151a and a key-ring 152a are disposed at the lower portion of the lower external barrel 15a. The device with a rotation effect 1a has the external barrel 10, the rotation barrel 20, the internal barrel 30, the pressing mechanism 50, the rotation mechanism 60, the deceleration mechanism 70 and the illuminating mechanism 80, all of which are the same elements as in the first embodiment; thus, details of each element are omitted.

Please refer to FIG. 13 to FIG. 19, which are related to the third embodiment. The device with a rotation effect 1d is a liquid container, such as a shower gel container, a hand wash container, a shampoo container or the like. The device with a rotation effect 1d comprises an external barrel 10d, a rotation barrel 20d, a pressing mechanism 50d, a rotation mechanism 60d and a deceleration mechanism 70d.

The external barrel 10d comprises an upper external barrel 11d, a main external barrel 12d, a decorative ring 17d and a lower external barrel 15d. The main external barrel 12d comprises an inner barrel 121d and an outer barrel 122d. The inner barrel 121d is a container for accommodating liquid content, not shown in the FIG. The decorative ring 17d is a telescopic sleeve. The upper end and the bottom end of the decorative ring 17d are connected with the main external barrel 12d and the lower external barrel 15d. Please refer to FIG. 18 and FIG. 19; when the main external barrel 12d moves downward, the decorative ring 17d is compressed accordingly. The decorative ring 17d is not only for decoration but also for preventing liquid or stains from entering the lower external barrel 15d.

The internal barrel decoration 43d can be attached to the surface of the inner barrel 121d, and the external barrel decoration 41d can be attached to the interior surface or exterior surface of the outer barrel 122d. The external barrel decoration 41d can also be printed on the exterior surface of the outer barrel 122d.

In the present embodiment, the rotation barrel 20d comprises a main rotation barrel 26d and a rotation barrel underframe 27d. The main rotation barrel 26d can be a thin plastic sheet printed with patterns; i.e., the main rotation barrel 26d itself is the rotation barrel decoration 42d. A plurality of fins 261d are disposed at the lower portion of the main rotation barrel 26d and a plurality of notches 271d are disposed on the rotation barrel underframe 27d, shown in FIG. 16, for engaging the each of the corresponding fins 261d.

The pressing mechanism 50d comprises a tube-pressing device 56d, a rotation shaft 54d and an elastic member 55d. The tube-pressing device 56d comprises a push button 51d (an indenter) and a tube 561d. The tube-pressing device 56d is connected with the upper external barrel 11d. The tube-pressing device 56d is applied for retrieving the liquid content inside the inner barrel 121d; thus, the tube 561d is disposed inside the inner barrel 121d. Because the tube-pressing device 56d is a well-known art, detailed description is omitted. Please refer to FIG. 15; an engagement part 1211d is disposed beneath the inner barrel 121d for engaging with the upper portion of the rotation shaft 54d. The rotation shaft 54d comprises a circle hole 542d for accommodating the elastic member 55d. The surface of the rotation shaft 54d comprises a rotary rim 541d. In the present embodiment, the rotation shaft 54d is a screw rod, and the rotary rim 541d is a thread.

Figure 15:
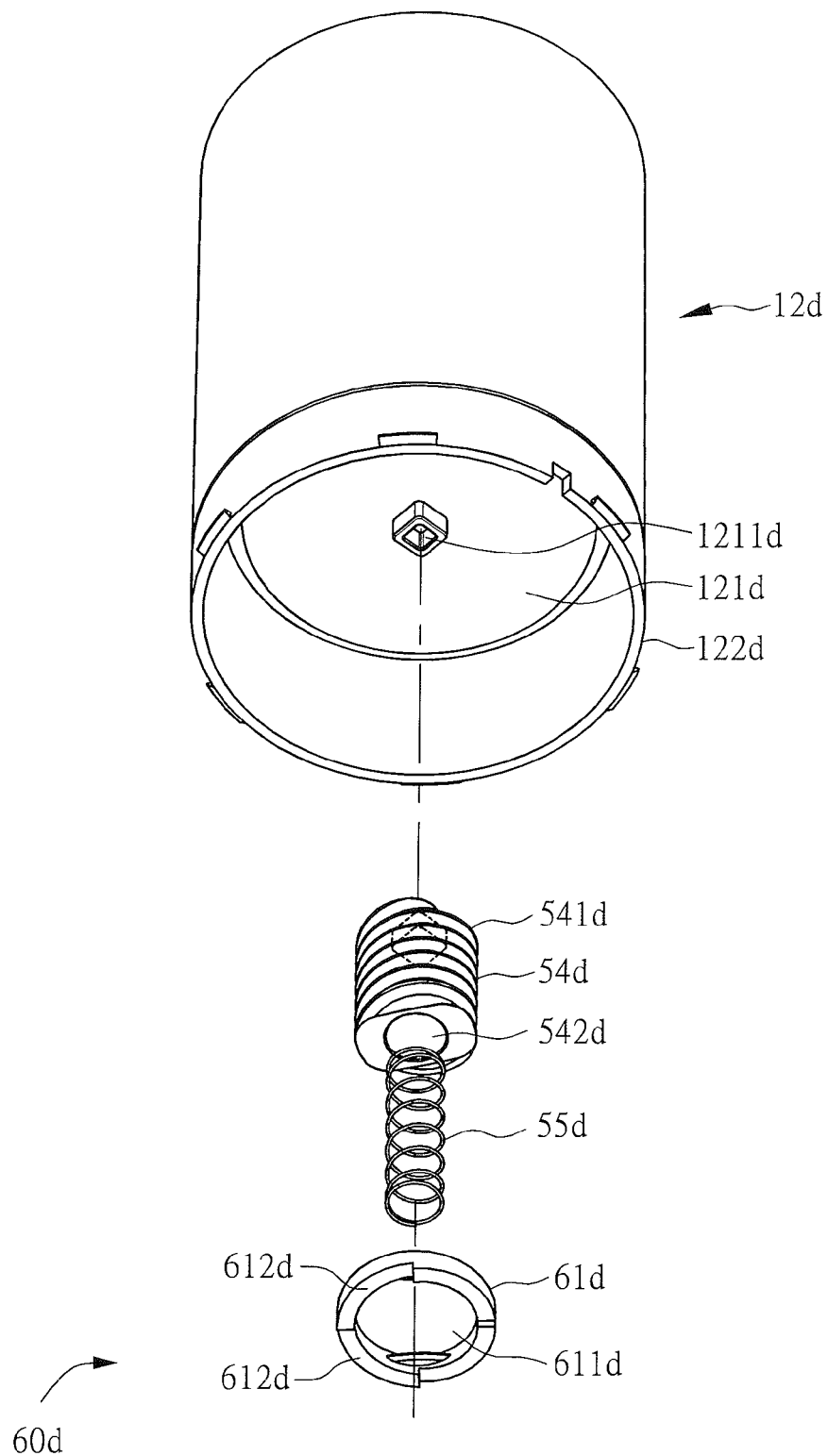
FIG. 15 is an exploded view of the main external barrel, the rotation shaft and the rotation element of the third embodiment.
Figure 16:
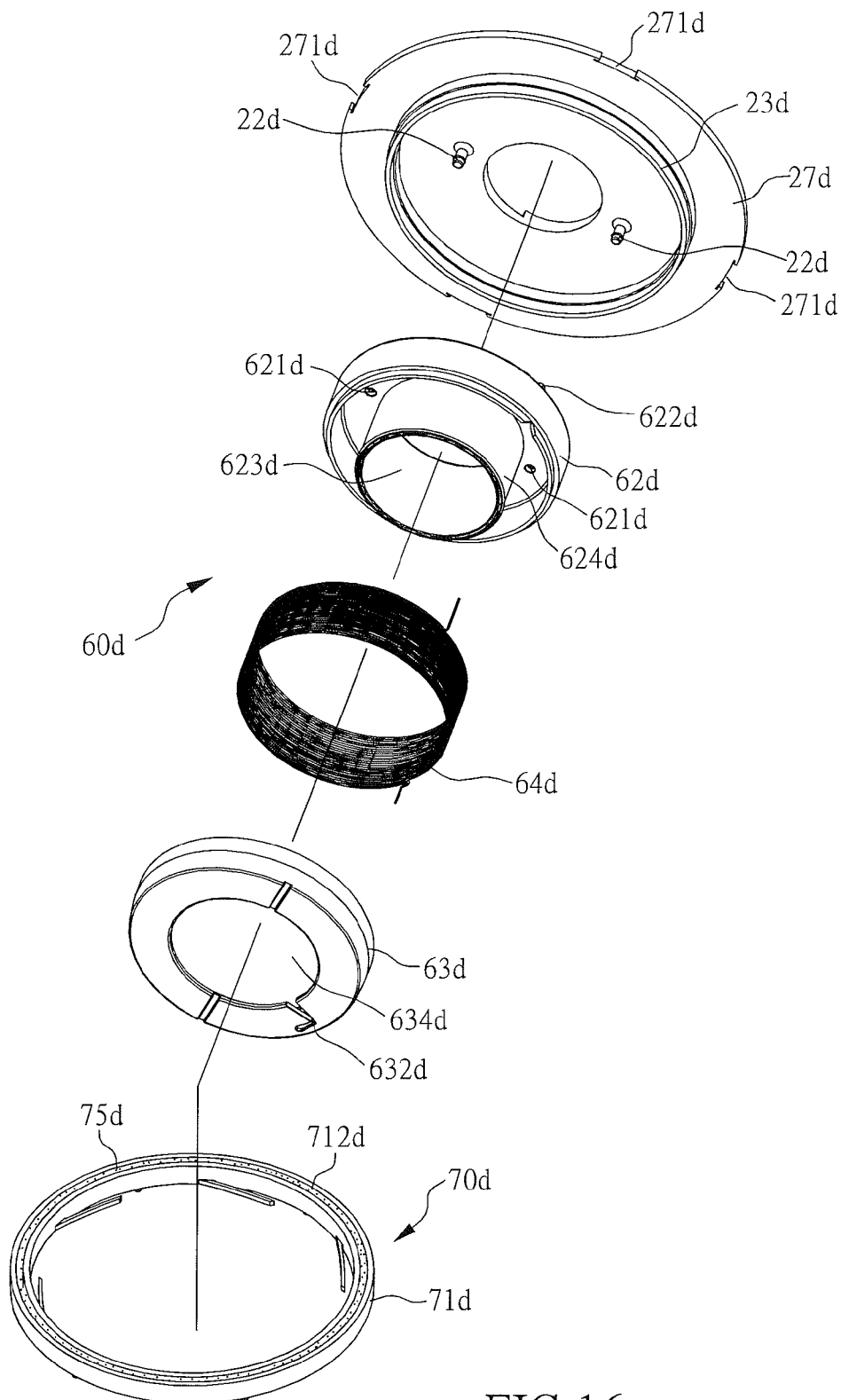
FIG. 16 is an exploded view of the rotation barrel underframe, the rotation element and the mating part of the third embodiment.
Figure 17:
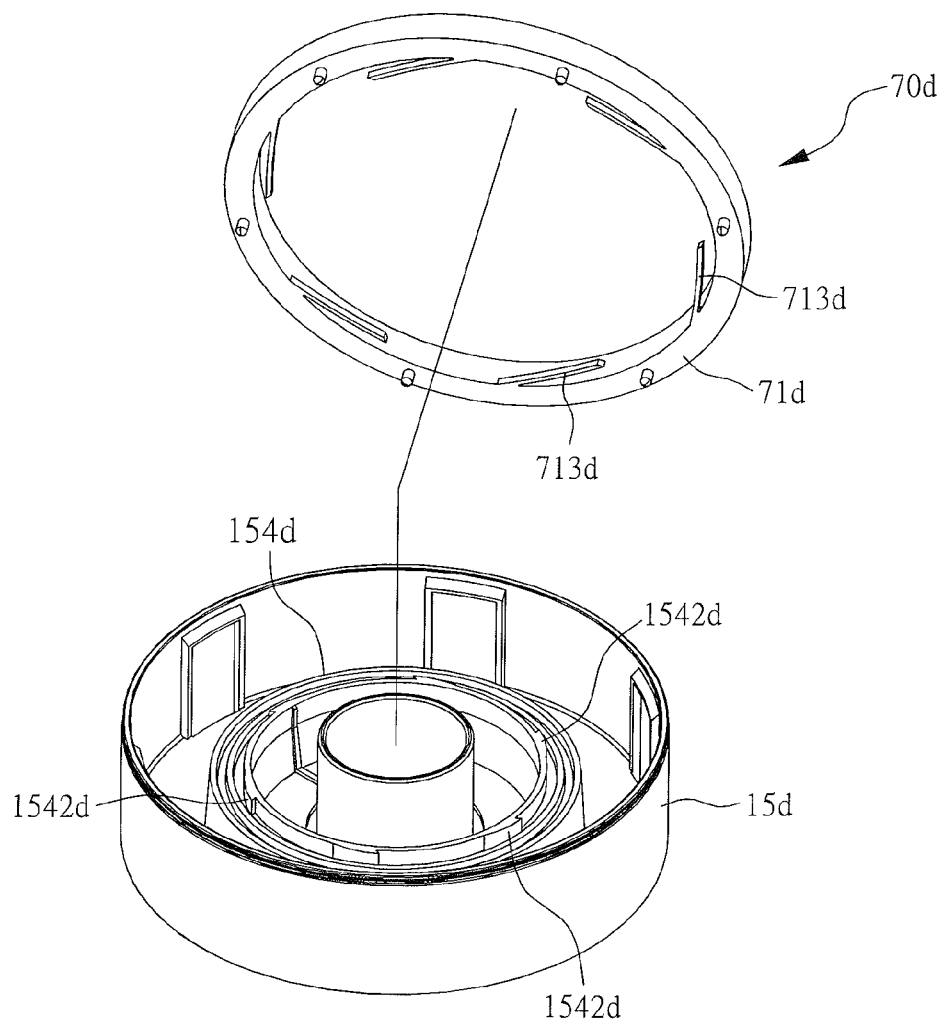
FIG. 17 is a bottom-view of the lower external barrel and the deceleration mechanism.

Please refer to FIG. 15 to FIG. 16. The rotation mechanism 60d comprises a rotation guiding element 61d, a rotation element 62d, a mating part 63d and a torsional elastic member 64d. The rotation guiding element 61d is disposed in the rotation barrel 20d, and the rotation guiding element 61d coordinates with the rotation shaft 54d. The rotation guiding element 61d comprises a guide slot 611d; when the rotation shaft 54d moves forward, due to the shape of the guide slot 611d, the rotary rim 541d drives the guide slot 611d and causes the rotation guiding element 61d to rotate along the first direction, which is a counter clockwise rotation in the present embodiment. The rotary tooth 612d is disposed at the lower portion of the rotation guiding element 61d. The rotary tooth 612d is designed with an inclined plane, and the upper portion of the rotation barrel underframe 27d also has an inclined plane to match with the guide tooth 21d. Therefore, when the rotation guiding element 61d rotates along the first direction, the rotation barrel 20d also rotates along the first direction accordingly.

Please refer to FIG. 16. The convex post 624d of the rotation element 62d matches with the circle hole 634d of the mating part 63d to allow the rotation element 62d to rotate relative to the mating part 63d. The two ends of the torsional elastic member 64d are connected with the mounting hole 622d of the rotation element 62d and the mounting hole 632d of the mating part 63d, respectively.

The rotation member 22d is disposed at the lower portion of the rotation barrel 20d. In this embodiment, the rotation member 22d is two protrusions for matching with the guide element 621d disposed at the upper portion of the rotation element 62d. In this embodiment, the guide element 621d is two cavities for allowing the rotation barrel 20d and the rotation element 62d to rotate synchronously.

The mating part 63d is fixed to the inner shell of the lower external barrel 15d by glue, for example. The mating part 63d of the present embodiment engages in between the interior circular post 153d and the exterior circular post 154 of the lower external barrel 15d. Thus the mating part 63d is unable to rotate after the mating part 63d has been disposed in the lower external barrel 15d. Therefore, when the rotation element 62d rotates along the first direction, the torsional elastic member 64d is twisted tightly; when the rotation element 62d stops rotating along the first direction, the torsion of the torsional elastic member 64d drives the rotation element 62d to rotate along the second direction, which is a clockwise rotation in the present embodiment.

In the present embodiment, the deceleration mechanism 70d comprises a guide ring 71d and a damping element 75d. Please refer to FIG. 17 to FIG. 19; the guide ring 71d comprises a round protruding rib 711d, an annular groove 712d and a plurality of brake strips 713d. The exterior circular post 154d has positioning grooves 1541d to match with the round protruding ribs 711d. The rotation barrel 20d has a damping guide member 23d disposed at the bottom end of the rotation barrel underframe 27d for matching with the annular groove 712d. Furthermore, in the present embodiment, the damping element 75d is a damping oil. When the present disclosure is assembled, damping oil 75d can be applied to the annular groove 712d for allowing the damping guide member 23d to reduce the rotation speed of the rotation barrel 20d due to contact with the damping oil 75d while the rotation barrel 20d is rotating freely. Please refer to FIG. 17, which is a top-view of the lower external barrel 15d and a bottom-view of the deceleration mechanism 70d. The exterior circular post 154d has a plurality of brake blocks 1542d for matching with the brake strip 713d, and each of the brake blocks 1542d is triangular in shape. When the guide ring 71d rotates along the first direction (counter clockwise in the present embodiment), none of the brake blocks 1542d blocks any of the brake strips 713d, and the guide ring 71d rotates along the first direction smoothly. On the other hand, when the guide ring 71 rotates along the second direction (clockwise in the present embodiment), each brake block 1542d blocks each of the corresponding brake strips 713d such that the guide ring 71d is unable to rotate along the second direction.

Figure 18:
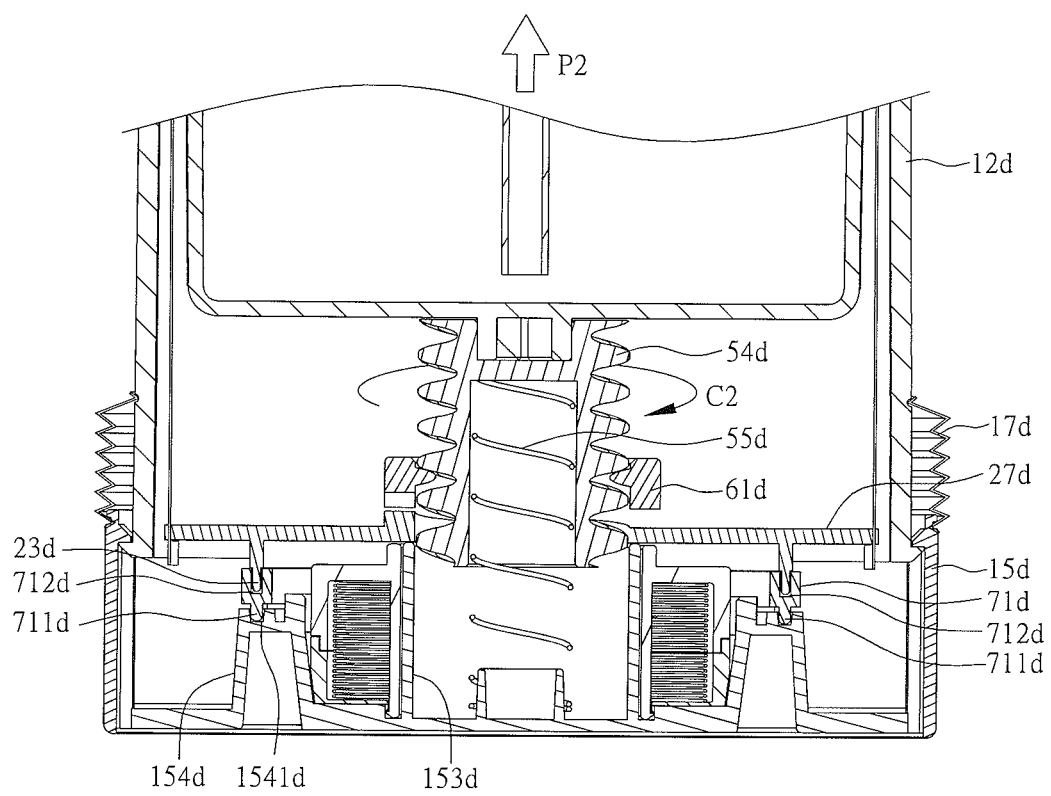
FIG. 18 is a partly enlarged cross-section view of the third embodiment to illustrate a state in which the pressing mechanism is not being pushed.
Figure 19:
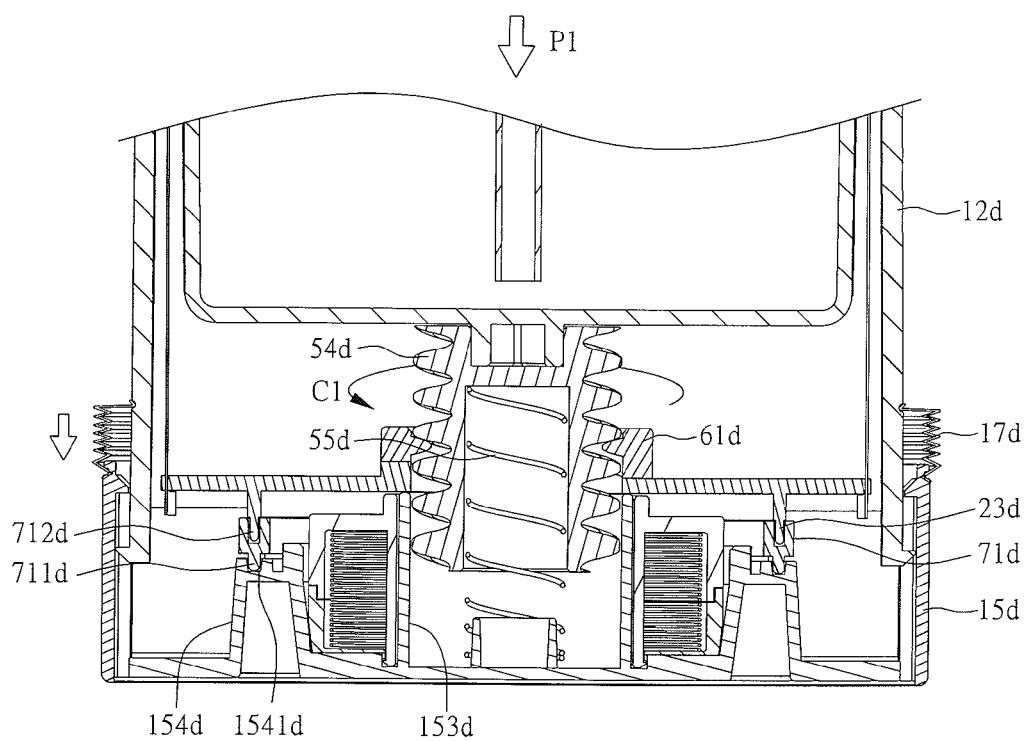
FIG. 19 is a partly enlarged cross-section view of the third embodiment to illustrate a state in which the pressing mechanism is being pushed.

To complement the brief description of the abovementioned elements, the operating flow is presented as follows. As shown in FIG. 18, the push button 51d has yet to be pressed; the major portion of the rotation shaft 54d is situated above the rotation guiding element 61d. As shown in FIG. 19, after a user pushes the push button 51d, the push button 51 is in the pressing course P1; the push button 51d pushes the main external barrel 12d downward and that consequently drives the rotation shaft 54d to move downward to drive the rotation guiding element 61d to rotate. The rotation element 62d comprises a through hole 623d for allowing the downward-moving rotation shaft 54d to enter the rotation element 62d and then to drive the rotation guiding element 61d to rotate along the first direction C1. Because the rotation shaft 54d also pushes the rotation guiding element 61d downward, the rotary tooth 612d of the rotation guiding element 61d is engaged with the guide tooth 21d of the rotation barrel 20d, such that the rotation barrel 20d also rotates along the first direction accordingly, and then the rotation member 22d of the rotation barrel 20d drives the rotation element 62d to rotate along the first direction. As a result, the torsional elastic member 64d is twisted tightly. Please refer to FIG. 17; when the rotation barrel 20d rotates along the first direction, due to the viscosity of the damping oil 75d, the guide ring 71 also rotates along the first direction, coordinating with the rotation barrel 20d. Because none of the brake strips 713d are blocked by the brake blocks 1542d, there is no need to overcome the resistance caused by the damping oil 75d when the user pushes the push button 51d.

The user can press the push button 51d several times quickly to increase the tension of the torsional elastic member 64d. After the user releases the push button 51d, the push button 51 is in the releasing course P2. Please refer to FIG. 19; the torsion of the elastic member 55d pushes the rotation shaft 54d backward and the main external barrel 12d moves backward as well. The rotation guiding element 61d also moves backward due to the movement of the rotation shaft 54d. Thus, the rotary tooth 612d of the rotation guiding element 61d does not engage with the guide tooth 21d of the rotation barrel 20d anymore. Then the torsion of the torsional elastic member 64d drives the rotation element 62d to rotate along the second direction C2, and the rotation element 62d drives the rotation barrel 20d to rotate along the second direction C2 as well. Due to the viscosity of the damping oil 75d, the damping guide member 23d will tend to rotate along the second direction C2. However, the guide ring 71d is unable to rotate along the second direction because each of the brake blocks 1542d blocks each of the corresponding brake strips 713d. As a result, the rotation speed of the rotation barrel 20d is reduced because of the resistance applied to the damping guide member 23d by the damping oil 75d.

It is noted that the above-mentioned embodiments are only for illustration. It is intended that the present disclosure cover modifications and variations of this disclosure provided they fall within the scope of the following claims and their equivalents. Therefore, it will be apparent to those skilled in the art that various modifications and variations can be made to the structure of the present disclosure without departing from the scope or spirit of the disclosure. For instance, the device with a rotation effect can be a stylus for a touch display (replacing the pen mechanism with the stylus), an ornament/accessory attached to a toy, a key chain, a necklace, a mobile phone, or other device.

What is claimed is:

1. A device with a rotation effect comprising:
an external barrel;
a rotation barrel disposed in the external barrel;
a rotation mechanism connected with the rotation barrel for rotating the rotation barrel;
a pressing mechanism connected with the external barrel, wherein the pressing mechanism comprises a pressing course and a releasing course; the pressing mechanism drives the rotation mechanism to rotate along a first direction during the pressing course, and the rotation mechanism rotates along a second direction during the releasing course, wherein the second direction and the first direction are opposite directions; and
a deceleration mechanism connected with the rotation barrel to reduce a rotation speed of the rotation barrel.

2. The device with a rotation effect as claimed in claim 1, the rotation mechanism further comprising a rotation element, a mating part, and a torsional elastic member, wherein two ends of the torsional elastic member are connected with the rotation element and the mating part, the rotation element is connected with the mating part, and the rotation element is disposed beneath and engaged with the rotation barrel, such that:
during the pressing course, the rotation element rotates along the first direction to twist the torsional elastic member, and
during the releasing course, the torsional elastic member drives the rotation element to rotate along the second direction to allow the rotation element to drive the rotation barrel to rotate, and the deceleration mechanism reduces the rotation speed of the rotation barrel.

3. The device with a rotation effect as claimed in claim 2, wherein the pressing mechanism comprises a push button, a rotation shaft and an elastic member, whereby, when the push button is in the pressing course, the rotation shaft moves forward, and when the push button is in the releasing course, the elastic member drives the rotation shaft to move backward.

4. The device with a rotation effect as claimed in claim 3, wherein the rotation mechanism further comprises a rotation guiding element; when the rotation shaft moves forward, the rotation shaft drives the rotation guiding element to rotate along the first direction to allow the rotation guiding element to drive the rotation barrel to rotate along the first direction, so that the rotation element also rotates along the first direction driven by the rotation barrel.

5. The device with a rotation effect as claimed in claim 4, wherein the deceleration mechanism comprises a guide ring and a damping element, and wherein the rotation barrel is engaged with the guide ring.

6. The device with a rotation effect as claimed in claim 5, wherein the damping element is a damping oil and the rotation speed of the rotation barrel is reduced by the damping oil.

7. The device with a rotation effect as claimed in claim 6, wherein the guide ring comprises an annular groove, and the rotation barrel comprises a damping guide member corresponding to the annular groove; the damping oil is disposed in the annular groove.

8. The device with a rotation effect as claimed in claim 7, wherein the rotation shaft comprises a rotary rim and the rotation guiding element comprises a guide slot; when the rotation shaft moves forward, the rotary rim drives the guide slot to cause the rotation guiding element to rotate along the first direction.

9. The device with a rotation effect as claimed in claim 4, wherein the rotation shaft comprises a rotary rim and the rotation guiding element comprises a guide slot; when the rotation shaft moves forward, the rotary rim drives the guide slot to cause the rotation guiding element to rotate along the first direction.

10. The device with a rotation effect as claimed in claim 9, wherein the external barrel comprises an upper external barrel and a main external barrel; the upper external barrel is connected with the main external barrel and the push button is disposed above the upper external barrel.

11. The device with a rotation effect as claimed in claim 10, wherein the device further comprises an internal barrel; the internal barrel is disposed in the rotation barrel, and the rotation shaft and the elastic member are disposed in the internal barrel, whereby, when the push button is in the pressing course, the rotation shaft moves forward, and when the push button is in the releasing course, the elastic member drives the rotation shaft to move backward.

12. The device with a rotation effect as claimed in claim 11, wherein the rotation guiding element is disposed in the rotation barrel; when the rotation shaft moves forward, the rotation guiding element engages with the rotation barrel, and when the rotation shaft moves backward, the rotation shaft drives the rotation guiding element to disengage the rotation barrel.

13. The device with a rotation effect as claimed in claim 12, wherein the deceleration mechanism comprises a guide ring and a damping element; the guide ring is disposed in the upper external barrel, and the rotation barrel connects with the guide ring.

14. The device with a rotation effect as claimed in claim 13, further comprising an illuminating mechanism.

15. The device with a rotation effect as claimed in claim 14, wherein the illuminating mechanism comprises an illuminating device, a battery and a light guide post; the light guide post is disposed inside the internal barrel.

16. The device with a rotation effect as claimed in claim 10, further comprising a pen mechanism, and the pen mechanism connects with the external barrel.

17. The device with a rotation effect as claimed in claim 16, wherein the pen mechanism comprises a holding barrel, a pen refill, a pen refill spring, and a retractable assembly; the holding barrel is connected with the external barrel; the retractable assembly is employed for controlling the pen refill to protrude from the holding barrel when the rotation shaft moves forward; the rotation shaft pushes the retractable assembly.

18. The device with a rotation effect as claimed in claim 10, wherein the main external barrel comprises an inner barrel and an outer barrel; the rotation barrel is situated between the inner barrel and the outer barrel, wherein the inner barrel is employed for containing a liquid.

19. The device with a rotation effect as claimed in claim 18, wherein the rotation barrel comprises a rotation barrel underframe; the rotation guiding element is disposed above the rotation barrel underframe; the deceleration mechanism comprises a guide ring and a damping element; the deceleration mechanism is disposed beneath the rotation barrel underframe.

20. The device with a rotation effect as claimed in claim 18, wherein the pressing mechanism further comprises a tube-pressing device, the tube-pressing device comprising a tube disposed in the inner barrel.

* * * * *